US007161887B2

(12) United States Patent
Snow et al.

(10) Patent No.: US 7,161,887 B2
(45) Date of Patent: Jan. 9, 2007

(54) METHOD AND APPARATUS FOR EXTRACTING DIGITAL DATA FROM A MEDIUM

(75) Inventors: Kevin Snow, Mountain View, CA (US); David Clifford, San Jose, CA (US)

(73) Assignee: Digeo, Inc., Kirkland, WA (US)

( * ) Notice: Subject to any disclaimer, the term of this patent is extended or adjusted under 35 U.S.C. 154(b) by 428 days.

(21) Appl. No.: 09/991,088

(22) Filed: Nov. 13, 2001

(65) Prior Publication Data

US 2003/0091338 A1    May 15, 2003

(51) Int. Cl.
*G11B 7/00* (2006.01)
(52) U.S. Cl. ............................... 369/53.32; 369/47.16; 369/59.25
(58) Field of Classification Search ............ 369/30.07, 369/47.16, 53.31, 53.32, 59.25; 700/94; 386/96, 98, 125
See application file for complete search history.

(56) References Cited

U.S. PATENT DOCUMENTS

| | | | | |
|---|---|---|---|---|
| 4,996,678 | A * | 2/1991 | Maeda | 369/30.07 |
| 5,124,963 | A * | 6/1992 | Ando | 369/30.09 |
| 5,528,572 | A * | 6/1996 | Koizumi et al. | 369/47.25 |
| 5,625,611 | A * | 4/1997 | Yokota et al. | 369/47.12 |
| 5,661,715 | A * | 8/1997 | Blaukovitsch | 369/275.4 |
| 6,026,067 | A * | 2/2000 | Tanaka | 369/47.18 |
| 6,560,577 | B1 * | 5/2003 | Gilbert et al. | 704/500 |
| 6,574,418 | B1 * | 6/2003 | Akiba et al. | 386/74 |
| 6,600,874 | B1 * | 7/2003 | Fujita et al. | 386/96 |
| 6,710,955 | B1 * | 3/2004 | Woodill et al. | 360/32 |
| 2001/0038579 | A1 | 11/2001 | Isobe et al. | |
| 2003/0156338 | A1 | 8/2003 | Kudo | |

FOREIGN PATENT DOCUMENTS

| | | |
|---|---|---|
| EP | 0 510 876 A2 | 10/1992 |
| GB | 2 340 293 A | 2/2000 |
| JP | 05174548 A * | 7/1993 |

(Continued)

OTHER PUBLICATIONS

Charlie Munro and Mark Nelson, "The Ultimate Home Jukebox", Dr. Dobb's Journal, Internet Programming, Jan. 2000, pp. 76-82.

(Continued)

*Primary Examiner*—Brian E. Miller
*Assistant Examiner*—Peter Vincent Agustin
(74) *Attorney, Agent, or Firm*—Kory D. Christensen; Stoel Rives, LLP

(57) ABSTRACT

A computer-implemented method and apparatus for extracting digital data from a medium. Digital audio extraction techniques are implemented with additional features that improve the quality of the resulting audio playback files. In one embodiment of the invention, a user can extract digital audio data from a source medium and store the data as a file or, alternatively, stream the data into a memory. The file/stream can then be analyzed to determine the precise locations, in time, at which the sound levels represented by the data cross a specified threshold, particularly at locations near and between track edges. This information can be stored for reference. Subsequently, the file/stream can be accurately divided into smaller segments wherein each segment contains one or more complete and distinct tracks, and the data representing sound levels below the specified threshold can be excluded from the resulting segments. The segments may then be encoded and/or further divided into standard playback files. Another embodiment of the invention includes an audio player. The player can play the playback files, in their original order, and can automatically include sections of silence between tracks, where required, and will refrain from including sections of silence or pauses between tracks that are intended to be played end-to-end.

28 Claims, 8 Drawing Sheets

FOREIGN PATENT DOCUMENTS

| | | |
|---|---|---|
| WO | WO 90/12395 | 10/1990 |
| WO | WO 02/43395 A2 | 5/2002 |
| WO | WO 02/058067 A1 | 7/2002 |

OTHER PUBLICATIONS

International Search Report, mailed Oct. 31, 2003.

* cited by examiner

US 7,161,887 B2

METHOD AND APPARATUS FOR EXTRACTING DIGITAL DATA FROM A MEDIUM

BACKGROUND OF THE INVENTION

1. Field of the invention

The invention relates generally to the field of data extraction and encoding, and more particularly to an improved system and method of extracting digital audio data from a medium to one or more playable files.

2. Background of the Invention

Digital Audio Extraction ("DAE"), also known generally as "ripping," is the process of copying a track from an audio disc, usually music, to a hard drive or other storage medium by creating a file (or group of files) in any number of encoded and/or compressed formats (e.g., WAV, MP3 . . . etc). A wide variety of software packages that utilize DAE are now available, and the average computer user can easily "rip" any number of tracks from a CD collection to one or more files on a computer hard drive. Subsequently, these tracks can be played back with software designed to read and play extracted audio files.

Although ripping has become a common practice for many computer users, high quality audio extraction can be difficult because of the complexities inherent in the way data are stored on audio discs. Audio CD data are organized into sectors in order to ensure a constant read rate. Each sector consists of 2,352 bytes of sound data along with synchronization, error correction, and control/display bits. These sectors are further broken down into sound samples. Each sector contains 588 samples of sound for each of two stereo channels, and each sample contains two bytes (16 bits) of sound data. The standard sampling rate of CD players is 44,100 samples per second.

Sectors are not arranged in distinct physical units. Instead, the data in one sector are interleaved with data in other sectors so that a defect in the disc will not destroy a single sector beyond correction. In addition, each track's location, or address, is recorded in the disc's Table of Contents ("TOC"), which is stored in the "lead in" area of every disc. Accordingly, an audio disc's TOC, much like a book's, is a good resource for determining where tracks begin and end. The TOC indicates the minute, second, and sector (to $\frac{1}{75}^{th}$ of a second) at which each track begins.

Extraction of audio/video content from a compact disk to a hard disk using current DAE software can be a difficult task. Every byte of a 2,352-byte sector of audio data is used strictly for audio. Essentially, no header exists; there is no information in the sector that allows for the exact positioning of a read head over a specific sector. To address an audio sector, a CD-ROM drive uses the TOC data to approximate how far out along the CD it must scan in order to find the beginning of a specified track. Drives typically reach an audio address that is within ± four sector addresses of the address being sought (±$\frac{4}{75}^{th}$ of a second in playback time), and a read request may return any one of the nine sectors. This inexact positioning may cause undesired clicks and pops, commonly referred to as "jitter," in extracted audio files.

Graph 110 of FIG. 1 is a plot (not to scale) of the audio level (e.g., audio volume, audio intensity, audio amplitude . . . etc) of an audio recording 120 over time (horizontal axis). Track divisions 130 represent where tracks (e.g., songs, of audio recording 120) begin and end. Threshold 140 represents a predetermined level threshold and lines 150 represent the points at which the sound level of audio recording 120 drops above or below threshold 140. For example, the level of audio recording 120 is below threshold 140 during time lapses 152 and 154. Time lapses 152 and 154 represent the dead silence that may exist at the beginnings and ends of songs on a CD, respectively. Lines 160 represent the points at which the sound level of audio recording 120 significantly drops but does not drop below threshold 140. For example, the level of audio recording 120 is dropped significantly during time lapse 164. Time lapse 164 represent a lull in the level of audio recording 120 that may occur between tracks, such as clapping in between songs of a live album. Finally, it is shown that a lull in the level of audio recording 120 does not exist in between tracks 3 and 4. This is an example of two tracks that blend into each other during playback without any lull in sound level.

Current DAE software can be used to extract audio recording 120, and FIG. 2 shows how current DAE programs function. A current DAE program will extract each track of audio recording 120 separately and create a pulse-code-modulation (PCM) file for each track (PCM files 201–204). These PCM files can eventually be converted to encoded file formats (encoded files 211–214) that may be read for playback of audio recording 120. These encoded file formats may be uncompressed or compressed (e.g., via MP3 or WAV file formats).

One disadvantage to current extraction techniques is that the software extracts each track from the source CD separately. First the software will read the CD TOC to determine the locations of the tracks to be extracted. Then each track will be extracted from a beginning point that may or may not be where the track actually starts and will end extraction at a point that may or may not be where the track actually ends. Again, the read head's accuracy in finding sector addresses is low, and it can only approximately find the start of a track. Given these uncertainties, one or more sectors of a track may be lost during extraction, or one or more sectors may be unintentionally added. For example, FIG. 3 illustrates some of the drawbacks of using DAE techniques currently known in the art. Audio track 310, beginning at time 302 and ending at time 304, can be extracted from an audio CD. The resulting PCM (pulse-code modulation) data file may contain missing sectors (e.g., PCM file 320), extra sectors (e.g., PCM file 330), or both missing and extra sectors (e.g., PCM file 340) at either or both ends of the file. This problem is further exacerbated when a file contains extra sectors that overlap with sectors contained in a consecutive track (e.g., overlapping sector 360 of PCM file 350). Overlapping sectors will cause increased jitter when extracted tracks are played back in their original order. Jitter is particularly noticeable between extracted tracks that are intended to blend into each other during playback (e.g., a segway, a house mix, or a live recording). These types of recordings may not have the same dead silence between tracks that typical multi-track recordings have.

The problems described above are caused because current DAE programs do not analyze the bridges between tracks to determine if there exists dead silence or just a lull in the sound, as in a live recording. Instead, current programs simply add a small amount of silence between extracted tracks during playback even though that silence may be undesirable for certain track sets. Finally, if there is some noticeable sound between tracks, there is a clear loss of sound quality during playback because current DAE techniques cannot adequately compensate for jitter.

SUMMARY OF THE INVENTION

A computer-implemented method of extracting digital audio data is described comprising: reading digital audio data from a medium; analyzing the digital audio data to determine when the levels of audio sound contained therein cross specified thresholds over time; and dividing the digital audio data into segments that each contain one or more complete tracks and exclude data representing sound levels below a specified threshold.

BRIEF DESCRIPTION OF THE DRAWINGS

A better understanding of the present invention can be obtained from the following detailed description in conjunction with the following drawings, in which.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

The process of digital audio extraction first requires a source medium that contains digital audio data. The source medium can be one of a variety of plastic disc forms (e.g., CDs, MiniDiscs, DVDs) or magnetic disk forms (e.g., floppy or hard disks). The audio data contained on the source medium is arranged in a format, e.g., pulse code modulation (PCM) format, that can be read by a standard audio player such as CD player. In addition, the audio data is typically divided into tracks, where each track represents a distinct block of audio data such as a song. Source mediums can contain a multitude of tracks and additional data that indicate the start of each track relative to the data in minutes, seconds, and sectors. For example, the Table of Contents ("TOC") of a CD contains data that indicate to a CD player the points at which CD tracks begin.

Figure 1:
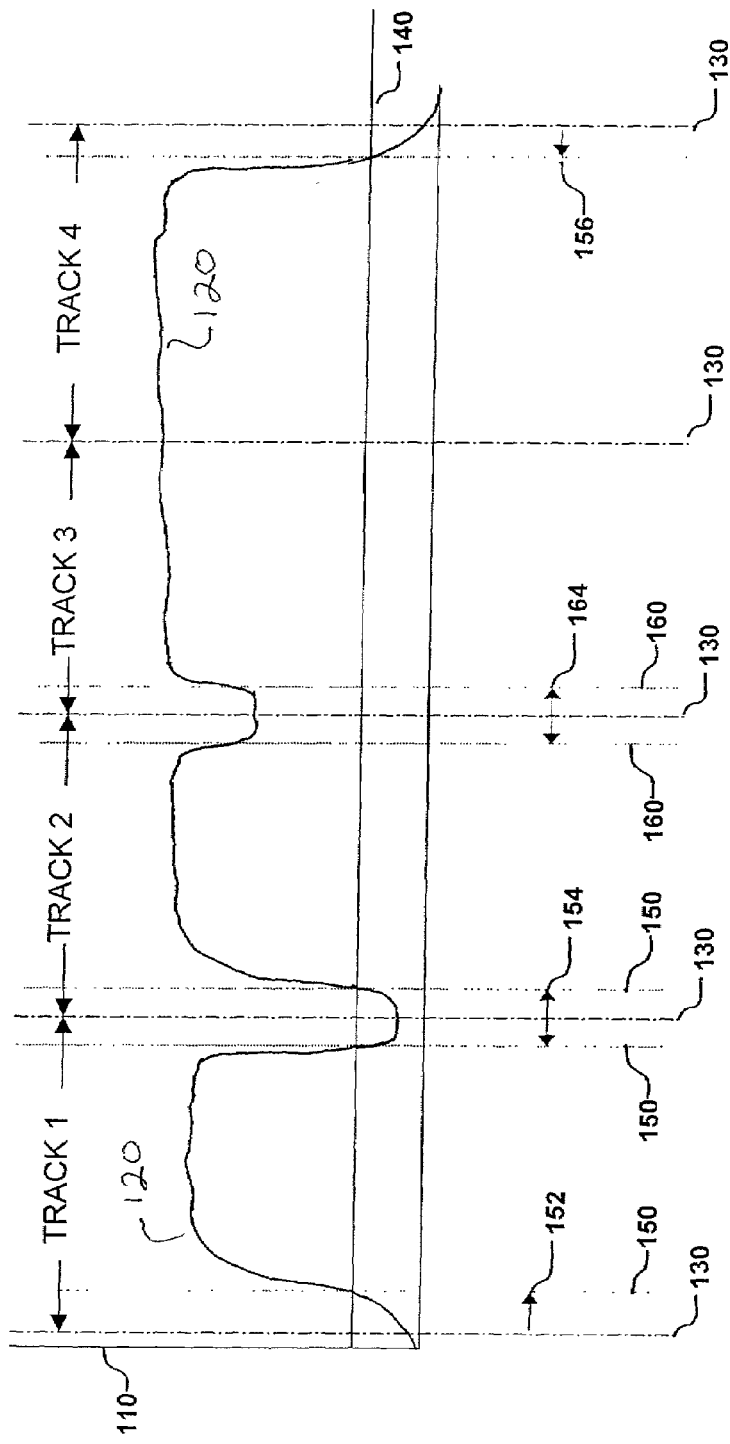
FIG. 1 illustrates a graph of an exemplary audio recording including sound levels plotted over time.
Figure 2:
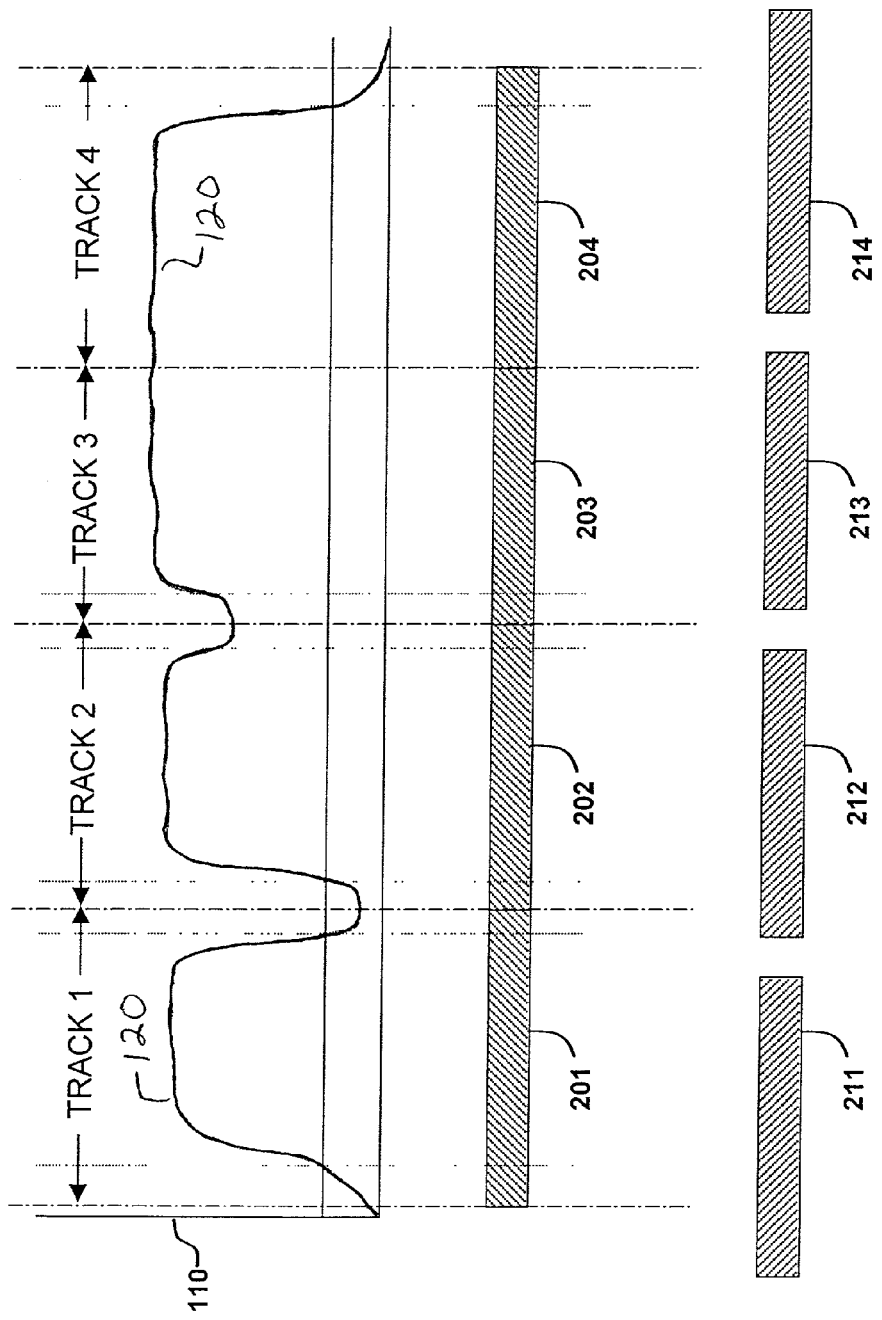
FIG. 2 illustrates a method by which digital audio extraction is used in the current art.
Figure 3:
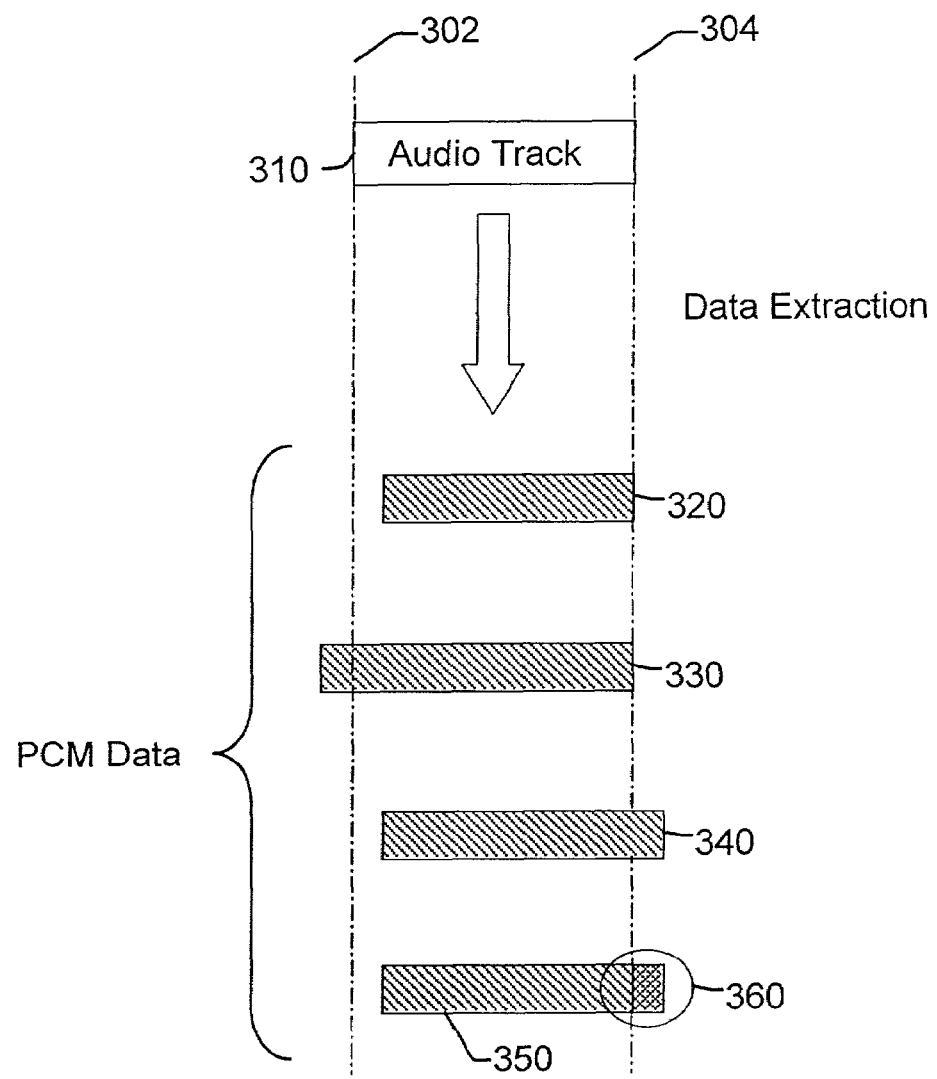
FIG. 3 illustrates some of the drawbacks in using current digital audio extraction techniques including some of the causes of jitter.
Figure 4:
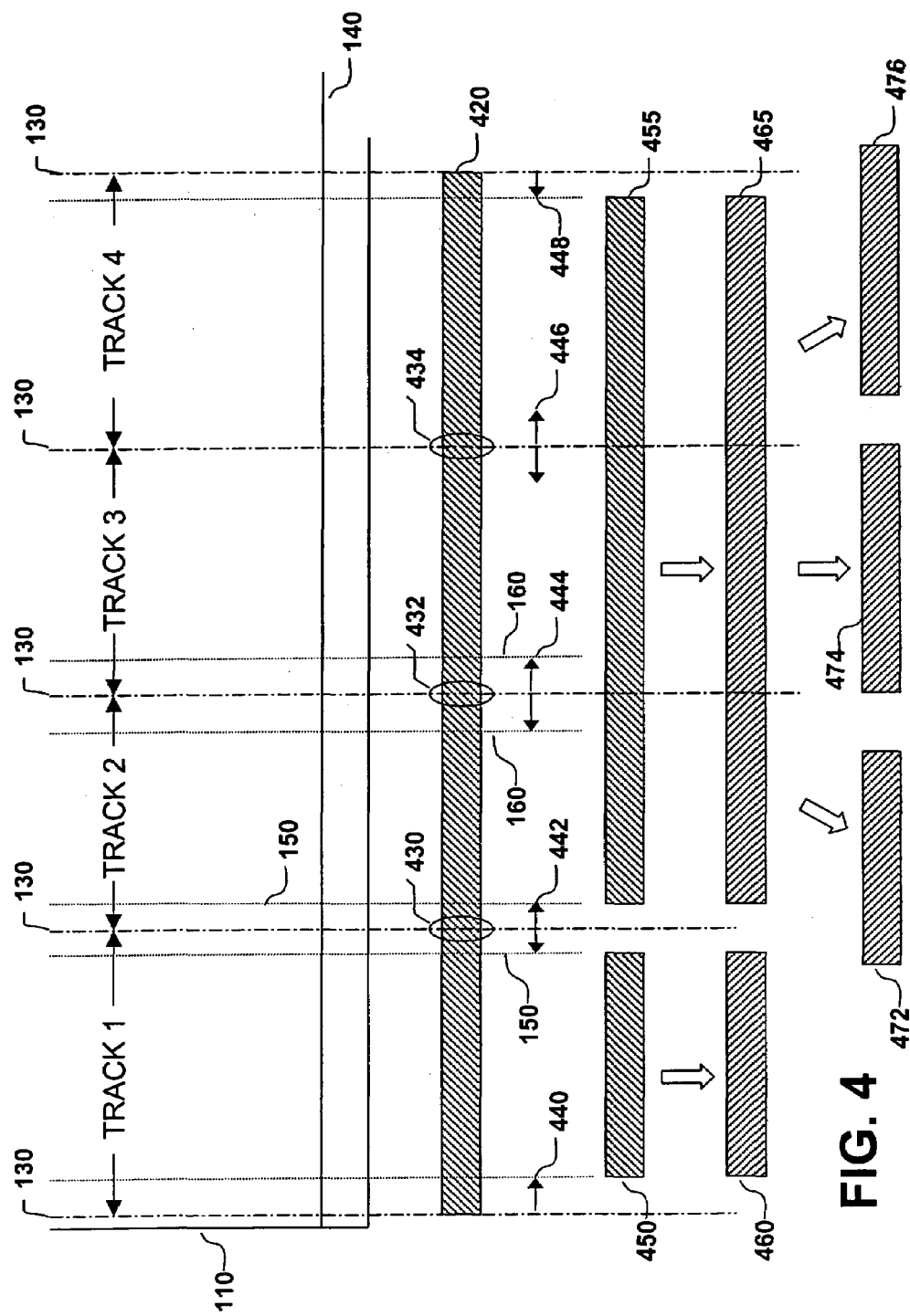
FIG. 4 illustrates one embodiment of the digital audio data extraction process, wherein audio data is extracted, segmented, encoded and sliced.

FIG. 4 shows graph 110 which is also depicted in FIGS. 1 and 2. Again, graph 110 is a plot (not to scale) of the sound level (vertical axis) of audio recording 120 over time (horizontal axis). Track divisions 130 represent where tracks, e.g., songs, of audio recording 120 begin and end. Threshold 140 represents a predetermined level threshold, and lines 150 represent the points at which the sound level of audio recording 120 drops above or below threshold 140. For example, the level of audio recording 120 is below threshold 140 during time lapse. 440, 442, and 448. Time lapses 440, 442, and 448 represent the dead silence that may exist at the beginnings and ends of songs on a CD, respectively. Lines 160 represent the points at which the sound level of audio recording 120 significantly drops but does not drop below threshold 140. For example, the level of audio recording 120 is dropped significantly during time lapse 444. Time lapse 444 represents a lull in the level of audio recording 120 in between tracks, such as clapping in between songs of a live album. Finally, it is shown that a lull in the level of audio recording 120 does not exist in between tracks 3 and 4. This is an example of two tracks that blend into each other during playback without any lull in sound level.

Figure 5:
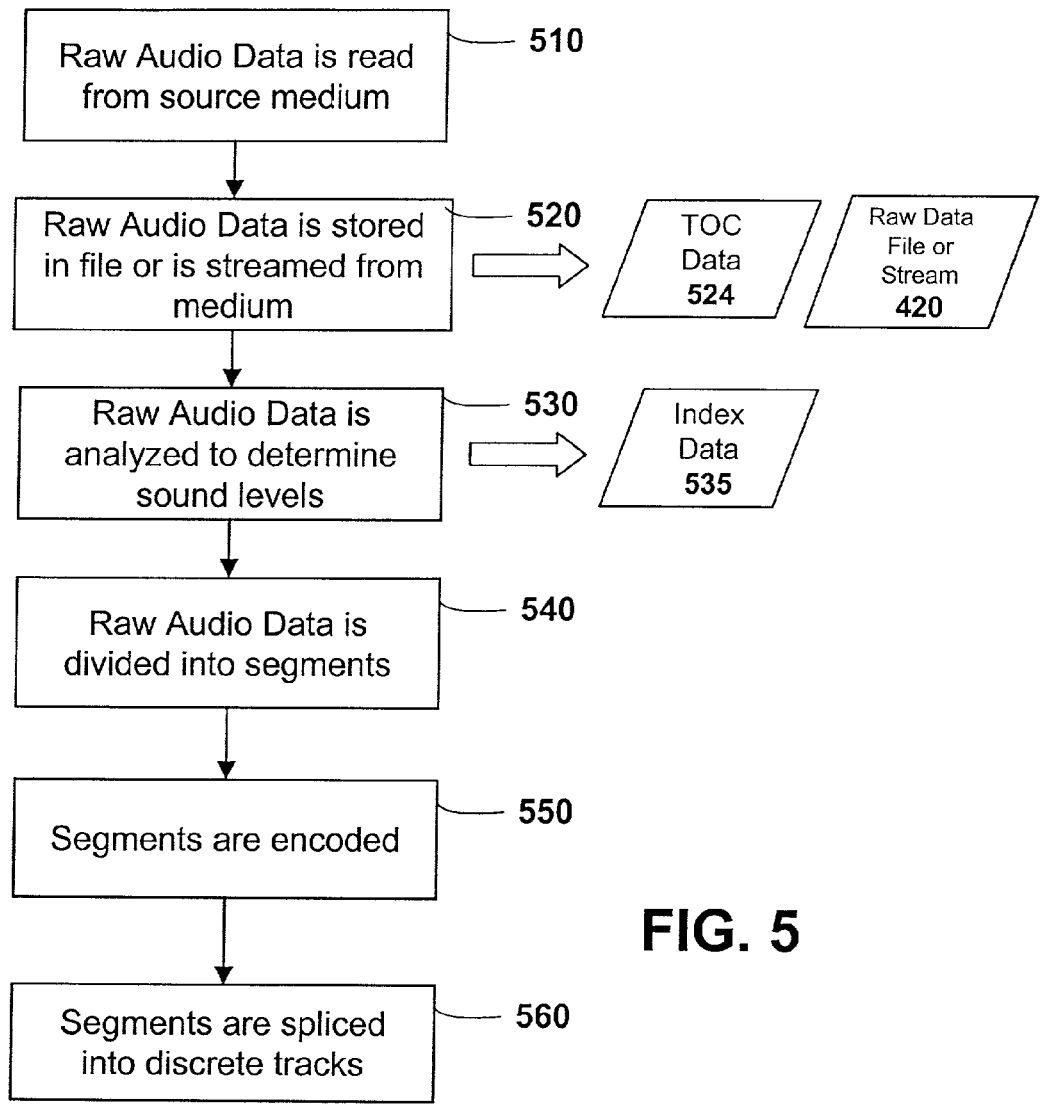
FIG. 5 illustrates a flow diagram of one embodiment of the digital audio data extraction process.

FIG. 5 shows a flow diagram of the steps taken by one embodiment of the invention to extract, analyze, and store digital audio data. It will appreciated by those skilled in the art that the steps diagramed in both FIGS. 5 and 6 may followed in the indicated order or in a different order while achieving many of the same benefits of the present invention. In addition, certain steps may be skipped and/or alternate steps may be employed while complying with the underlying principles of the invention.

At block 510 the raw audio data contained on the source medium is read by a computer device such as a CD-ROM, and at block 520 the raw data is stored as raw file 420 in an addressable memory space such as a hard drive or RAM. In one embodiment, rather than storing the raw data as a "file" at 420, the raw data may be streamed from the CD to an application which operates on the data stream as described herein. If a CD is being ripped, this file/stream 420 contains PCM data that includes audio data and possibly additional data (e.g., TOC data) used to address specific locations within the PCM data. It will be understood that the TOC data read from the source medium can be stored as part of raw file/stream 420 or as a separate file (e.g., TOC file 524).

Audio recording 120 of FIG. 4 is an exemplary plot of the sound levels produced when the audio data of raw file/stream 420 are played. At block 530, of FIG. 5, raw file/stream 420 is analyzed to determine the points at which the sound level of audio recording 120 drops below threshold 140. Threshold 140 may be set at a sound level comparable to the threshold of human hearing. In one embodiment, each point analyzed is equivalent to a sound sample (e.g., two bytes of data for each channel), which will represent some amplitude of sound. One embodiment of the invention locates these points using the TOC data stored in raw file/stream 420. The TOC data will indicate at which minute, second, and sector each track of the raw audio data (or other types of multimedia data) begins. For example, track edge 430 includes an address representing where track two begins. Once these locations are known, samples of audio data located at predetermined distances behind and/or ahead of, relative to time, each track edge is analyzed to determine if the indicated sound levels are above or below threshold 140. For example, it will be determined that the data sectors located across time lapse 442 contain sound levels below threshold 140. The data sectors marking the locations where the indicated sound levels cross threshold 140 may be stored in an index file, e.g., index file 535. In addition, if there exists no data sectors that indicate sound levels below threshold 140 in the vicinity of a track edge, then that information is stored as well.

Once the raw file/stream 420 (or the streamed content) has been completely analyzed, moving onto block 540, one embodiment of the invention divides raw file/stream 420 into smaller chunks or segments of data. This division will occur at every track edge except at those edges where sound levels are maintained above threshold 140. For example, a segment division will occur at track edge 430 but not at track edge 432 or 434. This is because the sound levels represented by time lapse 442 drop below threshold 140, and the sound levels represented by time lapses 444 and 446 are maintained above threshold 140. Sections of audio data that contain sound levels below threshold 140 will be referred to herein as "silent" sections. During or subsequent to the division of raw file/stream 420 (see block 540), the silent sections, represented by time lapses 440, 442 and 448, will be excluded from the resulting segments. Accordingly, segments 450 and 455 are generated and their corresponding shorter lengths are shown in FIG. 4. In one embodiment, segments 450 and 455 are merely two smaller files similar or identical in format to raw file/stream 420. In addition, while segment 450 contains only track 1, segment 455 contains tracks 2, 3, and 3. It will be appreciated by one skilled in the art that excluding sections of data that do not benefit the end user, e.g., silent sections, will be advantageous for a variety of reasons. For example, there will be less data to encode, the resulting files will be smaller in size, and the multimedia content stored within the files will start and end more precisely.

Depending on the number tracks and silent sections contained in raw file/stream 420, a multitude of segments may result after the division at block 540 of FIG. 5. Again, each of the segments can contain one or more tracks, and if one segment contains more than one track the sound levels produced at the track edges are high enough to be heard by an end user. At block 550, segments 450 and 455 are encoded to a data format that may be read by a standard digital audio player. For example, segments 450 and 455 may be encoded to a WAV file format or they may be encoded and compressed to an MP3 file format such that a standard MP3 player may read and play them. It will be understood that the encoding step of block 550 may occur before the segmenting step of block 540 or before the analyzing step of block 530 without losing the inventive features described herein. In addition, it will be appreciated that any number of segments produced at block 540 may be encoded and a variety of encoded formats may result following block 550. As shown in FIG. 4, segment 450 is encoded to playback file 460 and segment 455 is encoded to multi-track playback file 465. It will be understood that the size of these files will be different after encoding and/or compression takes place, but the resulting length of each segment, in time, will be preserved during playback. Either playback file 460 or 465 may be played by a standard digital audio player; however, a user may desire to store one of the three tracks contained on multi-track playback file 465 separately or insert one of the three tracks into a different arrangement of tracks. Therefore, at block 560, multi-track playback files are split such that a separate file is created for each distinct track.

One embodiment of the invention contains a file slicer that can divide one or more encoded files into their separate tracks. The file slicer can separate two or more tracks from a multi-track playback file such that no pertinent data are lost. This is accomplished with the help of the TOC data found in either TOC file 524 or raw file/stream 420, depending on where the TOC data were stored at block 520. The slicer uses the TOC data to find the precise sector(s) at which each track of playback file 465 begins. Then the slicer divides the playback file into smaller playback files, wherein each smaller playback file will contain a complete and distinct track. The slicer extracts all the corresponding groups of sectors of data that are representative of each track and then stores each extracted group as a smaller playback file. Therefore, no sectors are lost. For example, playback file 465 of FIG. 4 can be sliced into smaller playback files 472, 474 and 476. Each of the smaller playback files contains a complete and distinct track. These smaller playback files may be played separately or in sequence without any noticeable loss of sound quality during the time a player is switching between tracks.

It will be understood that the track addresses indicated by the TOC data are only compatible with the raw audio data stored in PCM format. Once encoding occurs the format of the audio data will change and the number and arrangement of sectors in the encoded data file may also change. However, one embodiment of the invention will anticipate this change and covert the address given by the TOC data to an address that is compatible with the encoded data format.

One embodiment of the present invention also includes an audio player. This audio player is capable of reading a variety of encoded file formats including those uncompressed and compressed. The audio player can playback the files generated by block 550 or 560 of the extraction process. One advantage of the audio player is that it can recognize tracks that are generated from a multi-track segment. For example, playback files 472, 474 and 476 are three separate tracks originating from segment 455. These tracks are unique because no sections of silence exist in between any two contiguous tracks. This is common for audio recordings that contain tracks that blend into each other, without any pauses of silence, or off a live album where a listener can still hear the sounds of the band and audience between songs. Therefore, it is advantageous to playback these tracks in their original order without any undesired silence or jitter. With reference to index file 535, the audio player can determine if two or more tracks are intended to be played end-to-end without a pause of silence, and, if so, the player moves from playing one track to the next without a pause or noticeable loss of sound quality. Furthermore, if a pause of silence is meant to exist between two contiguous tracks (e.g., between tracks 1 and 2 of FIG. 4), the player can reference index file 535 to determine exactly how long the pause of silence was in the original recording and can reinsert that amount of silence in between the tracks currently being played.

Figure 6:
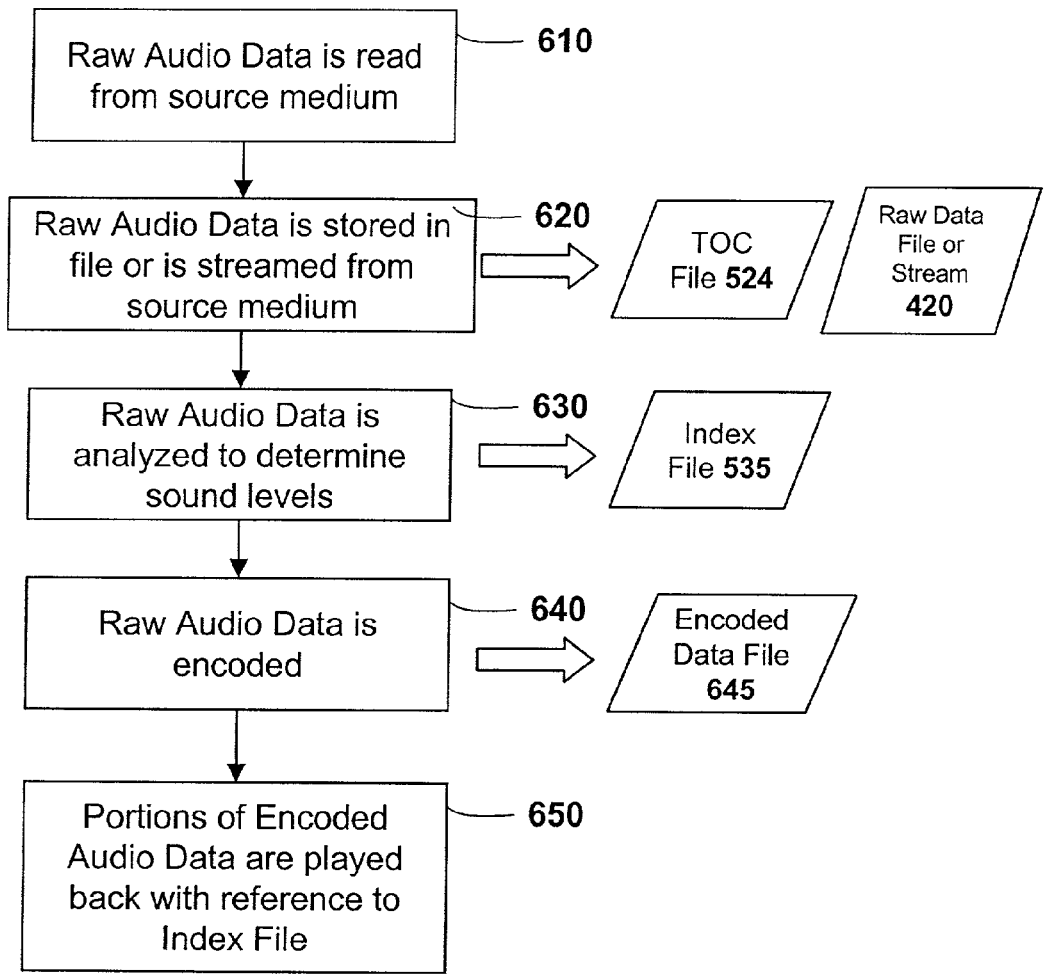
FIG. 6 illustrates a flow diagram of another embodiment of the digital audio data extraction process.

As seen in FIG. 6, a variation of the audio data extraction process described above may be executed while achieving the same benefits of the present invention. The steps represented by blocks 610, 620 and 630 are identical to those of blocks 510, 520 and 530, respectively. However, at block 640, the raw audio data is not broken up into segments, but is rather encoded into a large playback file, e.g., playback file 645. It will be understood that playback file 645 may contain all or less than all of the tracks found on raw data file 420. A player, in another embodiment of the invention, may playback any number of tracks off of playback file 645, in any sequence, and can use the information stored in index 535 to determine the exact positions to begin and end playback such that there is no noticeable loss in sound quality.

Figure 7:
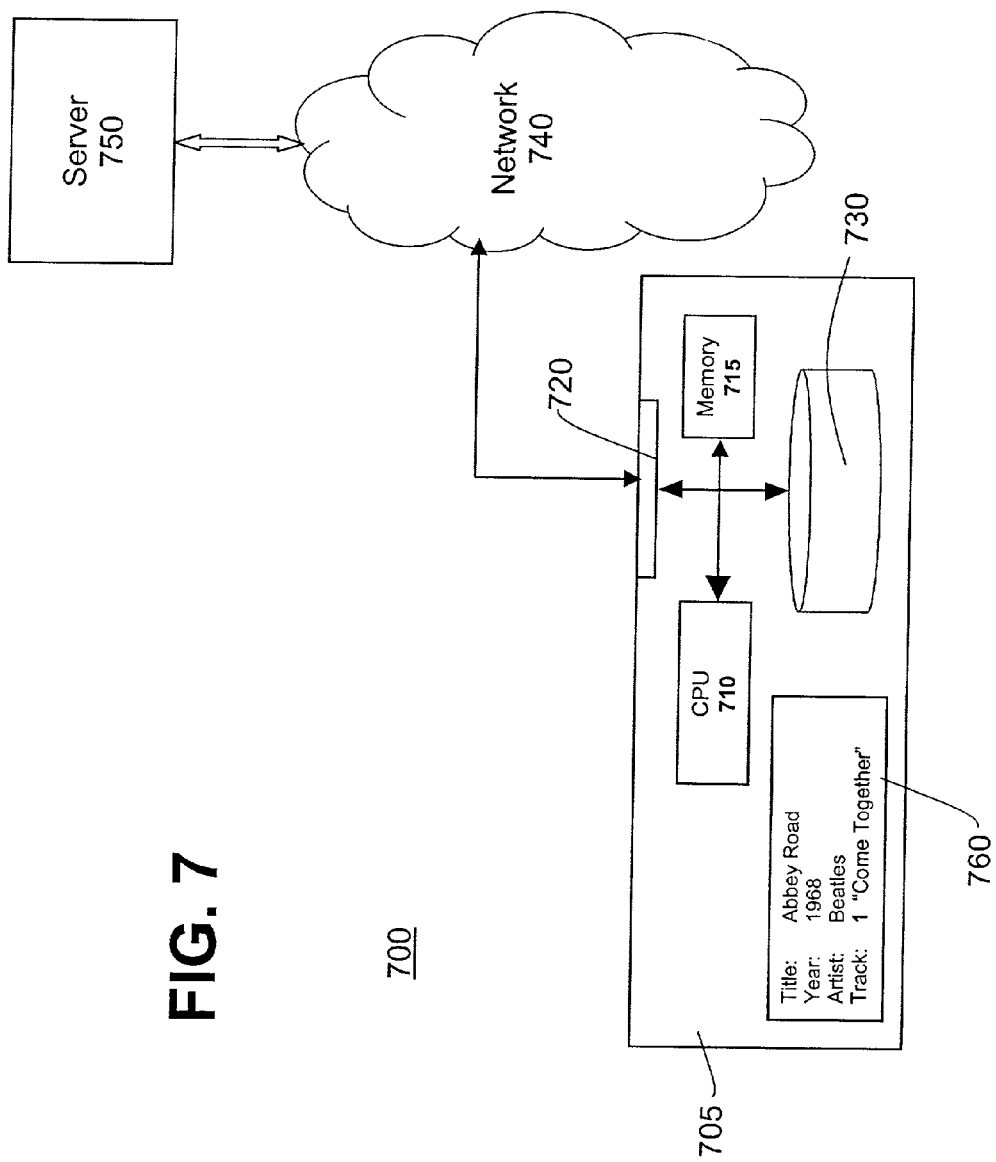
FIG. 7 illustrates s CD/DVD storage and playback system as it is used in conjunction with one embodiment of the invention.

In FIG. 7 a CD/DVD storage and playback system 700 is illustrated in another embodiment of the invention. The system 700 includes a storage and playback apparatus 705 which communicates over a network 740 to one or more servers 750. The steps represented by FIG. 5 or FIG. 6 may be embodied in program code stored on storage device 730 of playback apparatus 705 and may be loaded into memory 715 and executed by a microprocessor 710 contained therein. Playback apparatus 705 may be a stand-alone terminal or a client terminal connected with a network, e.g., network 740, further connected with one or more servers, e.g., server 750, via network interface card 720.

In one embodiment, a user loads each of his or her CDs into playback apparatus 705 and all of the digital audio data contained on each CD is extracted and stored into separate raw data files on storage device 730. Each raw data file may be segmented, encoded, and sliced given the methods described above. Ultimately, playback files containing individual tracks are generated, and the user may playback such files on the playback apparatus 705. The playback apparatus 705 may also include user display 760 which can display information relevant to a selected track. For example, user display 760 may display the artist name, album title, song title, track number (relative to a track set) and album release date. It will be appreciated that this CD-related information may be retrieved from data stored on the CD, from manual user input, or from a database found on a server 750.

In one embodiment, the techniques described herein may be implemented on a specialized multi-CD ripper apparatus such as that described in co-pending application entitled "MULTIMEDIA TRANSFER SYSTEM" (Ser. No. 09/717,458) which is assigned to the assignee of the present application and which is incorporated herein by reference. For example, using this system, content from multiple CDs may be concurrently processed and stored on a user's playback apparatus 705 in the manner described above.

Figure 8:
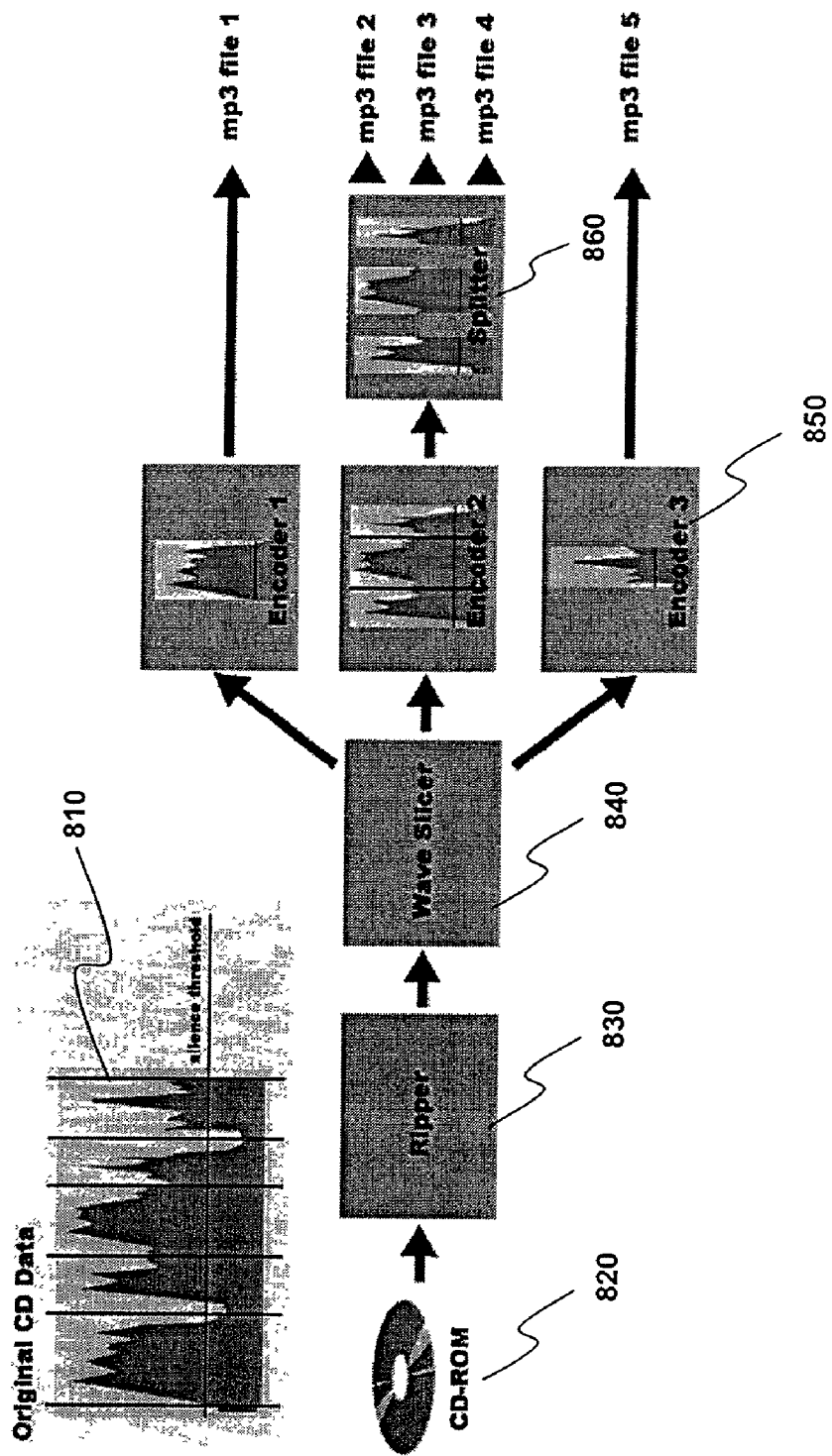
FIG. 8 is a data flow diagram illustrating one embodiment of a system for reading, slicing, encoding, and splitting multimedia content.

One specific embodiment of a system for reading, slicing, encoding and splitting multimedia content as described herein is illustrated in FIG. 8. The system is illustrated as a plurality of modules which may be embodied in hardware, software, or any combination thereof. As illustrated, the multimedia content 810 is initially streamed from a CD 820 (or other medium) into memory by a media ripper module 830. The sound levels of the raw streamed content are then analyzed by a wave slicer module 840 which separates the raw stream data into segments based on its analysis (e.g., using the techniques described above). Index data, TOC data and/or other types of multimedia-related data may also be processed by the media ripper module 830 and the wave slicer module 840 during the foregoing processing stages. One or more multimedia encoder modules 850 then encode each of the multimedia segments using a particular encoding algorithm (e.g., MP3, AC-3, . . . etc, for audio; MPEG-2, MPEG-4, RealVideo 8, . . . etc, for Video). Once encoded, each individual segment may then be logically divided by a splitter module 860 as described above. For example, if the raw multimedia data is audio data, the splitter module 860 may divide the encoded audio segments into a plurality of distinct MP-3 files. As previously mentioned, audio encoding may occur before or after audio segment splitting, depending on the embodiment.

Embodiments of the present invention include various steps, which were described above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the present system. It will be apparent, however, to one skilled in the art, that the system and method may be practiced without some of these specific details. For example, while the techniques described above were employed in the context of ripping audio from CDs, the same techniques may be employed using a variety of different media (e.g., DVD audio/video). Accordingly, the scope and spirit of the invention should be judged in terms of the claims which follow.

What is claimed is:

1. A computer implemented method comprising:
    reading digital audio data from a source medium, the digital audio data divided into a plurality of tracks, each representing a discrete chunk of digital audio data and having sound levels varying as a function of a variable;
    analyzing the digital audio data to determine the levels of sound as a function of the variable and determining one or more precise values of the variable at which the level of sound crosses a specified threshold; and
    dividing the digital audio data into one or more segments, each segment containing one or more tracks and each segment excluding the digital audio data having levels of sound below the specified threshold, and wherein dividing includes:
        if the level of sound at a track edge between a first track and a second track is not below the specified threshold, then including the first and second tracks in the same segment; and
        if the level of sound at a track edge between a third track and a fourth track is below the specified threshold, then including the third and fourth tracks in separate segments.

2. The method of claim 1 where in the source medium contains Table of Contents ("TOC") data identifying the values of the variable at which each track begins and ends within each segment, said method further comprising reading and storing the TOC data.

3. The method of claim 2 further comprising:
    encoding at least one of the segments to generate a playback file that may be read by an audio player.

4. The method of claim 3 wherein the encoding includes compressing the digital audio data contained on the segment.

5. The method of claim 4 wherein the compressing comprises MP3 compression.

6. The method of claim 4 wherein the compressing comprises AC-3 compression.

7. The method of claim 3 further comprising:
    if a playback file contains two or more tracks then, with reference to the TOC data, dividing the playback file into smaller playback files such that each smaller playback file represents a discrete track and two or more of the smaller playback files may be played consecutively without a pause or loss in sound quality during the time an audio player is switching between playing contiguous tracks.

8. The method of claim 3 further comprising:
if a first segment is contiguous to a second segment, determining an amount of time equal to the digital audio data that was excluded during said dividing, from between the first and second segments; and
storing the amount of time and its position relative to the one or more segments; and
inserting silence for a time equal in length to the said amount time after an audio player's playback of the one or more tracks contained in the first segment and prior to an audio player's playback of the one or more tracks contained in the second segment.

9. The method of claim 1 wherein the variable is time.

10. The method of claim 1 wherein the variable is a number of data sectors.

11. The method of claim 1 wherein the source medium is a compact disc ("CD").

12. The method of claim 1 wherein the source medium is a mini-disc.

13. The method of claim 1 wherein the source medium is a digital video disk ("DVD").

14. The method of claim 1 wherein the audio data is PCM data.

15. A machine readable medium including program code which, when executed by a machine cause said machine to:
read digital audio data from a source medium, the digital audio data divided into a plurality of tracks, each representing a discrete chunk of digital audio data and having sound levels varying a function of a variable;
analyze the digital audio data to determine the levels of sound as a function of the variable and determining one or more precise values of the variable at which the level of sound crosses a specified threshold; and
divide the digital audio data into one or more segments, each segment containing one or more tracks and each segment excluding the digital audio data having levels of sound below the specified threshold, wherein dividing includes:
if the level of sound at a track edge between a first track and a second track is not below the specified threshold, then including the first and second tracks in the same segment; and
if the level of sound at a track edge between a third track and a fourth track is below the specified threshold then including the third and fourth tracks in separate segments.

16. The machine readable medium of claim 15 wherein the source medium contains Table of Contents (TOC) data identifying the values of the variable at which each track begins and ends within each segment.

17. The machine readable medium of claim 16 further causing said machine to:
encode at least one of the segments to generate a playback file that may be read by an audio player.

18. The machine readable medium of claim 17 wherein the encoding includes compressing digital audio data contained on the segment.

19. The machine readable medium of claim 17 further causing said machine to:
if a playback file contains two or more tracks then with reference to the TOC data, divide the playback file into smaller playback files such that each smaller playback file represents a discrete track, and two or more of the smaller playback files may be played consecutively without a pause or loss in sound quality during the time an audio player is switching between playing contiguous tracks.

20. The machine readable medium of claim 17 further causing said machine to:
determine, wherein a first segment is contiguous a second segment, an amount of time equal to the digital audio data that was excluded between the first and second segments;
store the amount of time and its postion relative to the one or more segments; and
insert silence for a time equal in length to said amount time after an audio player's playback of the one or more tracks contained in the first segment and prior to an audio player's playback of the one or more tracks contained in the second segment.

21. An apparatus comprising:
a ripper module to read multimedia content from a medium into memory; and
a wave slicer module to divide said multimedia content into one or more segments based on a measured audio level of said multimedia content dropping below a predetermined threshold value at beginning and an end of each of said segments, wherein said multimedia content is divided such that, if the level of sound at a track edge between a first track and a second track is not below the specified threshold, the first and second tracks are included in the same segment; and if the level of sound at a track edge between a third track and a fourth track is below the specified threshold, the third and fourth tracks are included in separate segments.

22. The apparatus as in claim 21 further comprising:
one or more encoder modules to en encode said segments using a specified encoding algorithm.

23. The apparatus as in claim 22 further comprising:
a splitter module to split said segments into discrete a tracks based on index data identifying said tracks.

24. The apparatus as in claim 21 wherein said multimedia content is PCM audio content.

25. The apparatus as in claim 24 wherein said medium is a compact disk.

26. A computer-implemented method comprising:
reading digital audio data from a source medium, the digital audio data divided into a plurality of tracks and having sound levels changing over time;
analyzing the digital audio to determine the levels of sound as a function of time and determining one or more points in time at which the level of sound is below a specified threshold; and
dividing the digital audio data into one or more segments, each segment containing one or more of said tracks and each segment excluding the digital audio data having levels of sound below the specified threshold, wherein dividing includes:
if the level of sound at a track edge between a first track and a second track is not below the specified threshold, then inducing the first and second tracks in the same segment; and
if the level of sound at a track edge between a third track and a fourth track is below the specified threshold, then including the third and fourth tracks in separate segments.

27. The method of claim 26 wherein the source medium contains Table of Contents ("TOC") data identifying the time at which each track begins and ends within each file and within each segment, said method further comprising reading and storing the TOC data.

28. The method of claim 27 further comprising:
encoding one or more of the segments to generate playback file that may be read by an audio player.

* * * * *